United States Patent [19]

Nakamura

[11] Patent Number: 4,588,298

[45] Date of Patent: May 13, 1986

[54] STEP TABLET

[75] Inventor: Masao Nakamura, Tokyo, Japan

[73] Assignee: Fuji Photo Film Co., Ltd., Kanagawa, Japan

[21] Appl. No.: 556,824

[22] Filed: Dec. 1, 1983

[30] Foreign Application Priority Data

Dec. 1, 1982 [JP] Japan .............................. 57-182349[U]

[51] Int. Cl.⁴ ............................................ G01N 21/00
[52] U.S. Cl. ...................................... 356/443; 283/37; 354/20; 356/243
[58] Field of Search ............... 356/243, 404, 421, 425, 356/443, 42; 428/913; 355/55; 283/36, 37; 354/20

[56] References Cited

U.S. PATENT DOCUMENTS

| 2,226,167 | 12/1940 | Gillon | 356/443 X |
| 2,253,231 | 8/1941 | Friedell | 356/443 X |
| 2,322,044 | 6/1943 | McFarlane et al. | 356/404 |
| 2,380,244 | 7/1945 | Jones et al. | 356/243 X |
| 4,047,817 | 9/1977 | Enomoto | 356/404 |
| 4,183,990 | 1/1980 | Uchida et al. | 428/212 |
| 4,492,474 | 1/1985 | Miller | 356/404 |

Primary Examiner—Davis L. Willis
Assistant Examiner—Robert D. V. Thompson, III
Attorney, Agent, or Firm—Sughrue, Mion, Zinn, Macpeak & Seas

[57] ABSTRACT

A step tablet with which an amount of exposure or degree of exhaustion of a developing solution can very readily been determined. The step chart is composed of a number of rectangular patches of photosensitive material, arranged in an order of sensitivity. The steps are each marked with two indicia, one having an optical density corresponding, upon development, of a step of minimum optical density, while the other corresponds to a step of maximum optical density.

5 Claims, 4 Drawing Figures

STEP TABLET

BACKGROUND OF THE INVENTION

The present invention pertains generally to a step tablet (step wedge), which is a device employed for testing an amount of exposure of a photographic plate or the degree of exhaustion of a developing solution used for developing a photographing plate. Such devices find use, for instance, in determining the amount of exposure of a photographic lithographic printing plate or the like. Particularly, the invention pertains to a step tablet that enables a more certain and easier determination to be made as to the amount exposure or degree of exhaustion of a developing solution.

Conventionally, a step tablet has been used to determine the proper exposure and development conditions for positive presensitized (PS) plates. In use, the step tablet is placed adjacent the photosensitive surface of the plate, and then the plate is exposed through the step tablet. Upon developing, the plate should have discernible several shades of gray, about five in the typical application.

A conventional step tablet is illustrated in FIG. 1 of the drawings. The tablet is composed of a number of patches or steps having different optical densities. In the example here given, the density varies from a minimum value of 0.05 in increments of 0.15. Each step has a rectangular shape.

Each of the steps is marked with an Arabic numeral. The optical density of all of the Arabic numerals corresponds to the minimum optical density among the various steps. Hence, because the step of minimum density and the numeral which marks it have the same density, that numeral is indiscernible. The step having the most clearly discernible numeral is the step of maximum density, here marked by "15".

After developing the plate, the operator examines the area of the plate which was exposed through the step tablet to determine the last step, in descending order of optical density, having a discernible marking numeral. Above that step will be found approximately five steps of varying optical density. An example of this area of a developed plate is shown in FIG. 2.

It is sometimes quite difficult to accurately determine the last step for which the numeral is visible. For instance, it might not be readily possible to determine whether the steps marked with numerals "15" to "10" are all solid, or whether the numerals "15" to "9" are all solid, that is, it might not be possible to determine whether the step marked "10" or the step marked "9" is the last step having a discernible numeral.

Accordingly, it is an object of the present invention to provide a step tablet in which the amount of exposure or the quality of a developing solution can be readily and accurately determined.

More specifically, it is an object of the present invention to provide a step tablet with which the amount of exposure or the quality of a developing solution can readily be ascertained by quickly identifying a particular step on the step tablet.

SUMMARY OF THE INVENTION

The above and other objects of the present invention are met by a step tablet in which each step is marked by two indicia. One of the indicia corresponds to transparency to actinic radiation, and the other to opacity to actinic radiation. The two sets of indicia correspond to minimum optical density and an optical density equal to or higher than the maximum density on the tablet. Preferably, the two indicia are like Arabic numerals for each step, although other arrangements can be employed as well. The steps can be any practical shape, and can be arranged in a line, circular pattern, or any other desired pattern.

BRIEF DESCRIPTION OF THE DRAWINGS

FIG. 1 is a schematic representation of a conventional step tablet;

FIG. 2 shows a portion of a developed photosensitive plate which was exposed through the step tablet of FIG. 1;

FIG. 3 is a schematic representation of a step tablet constructed in accordance with the present invention; and FIG. 4 shows a portion of a developed photosensitive plate which was exposed through the step tablet of FIG. 3.

DESCRIPTION OF THE PREFERRED EMBODIMENTS

Figures 1, 2, 3, 4:
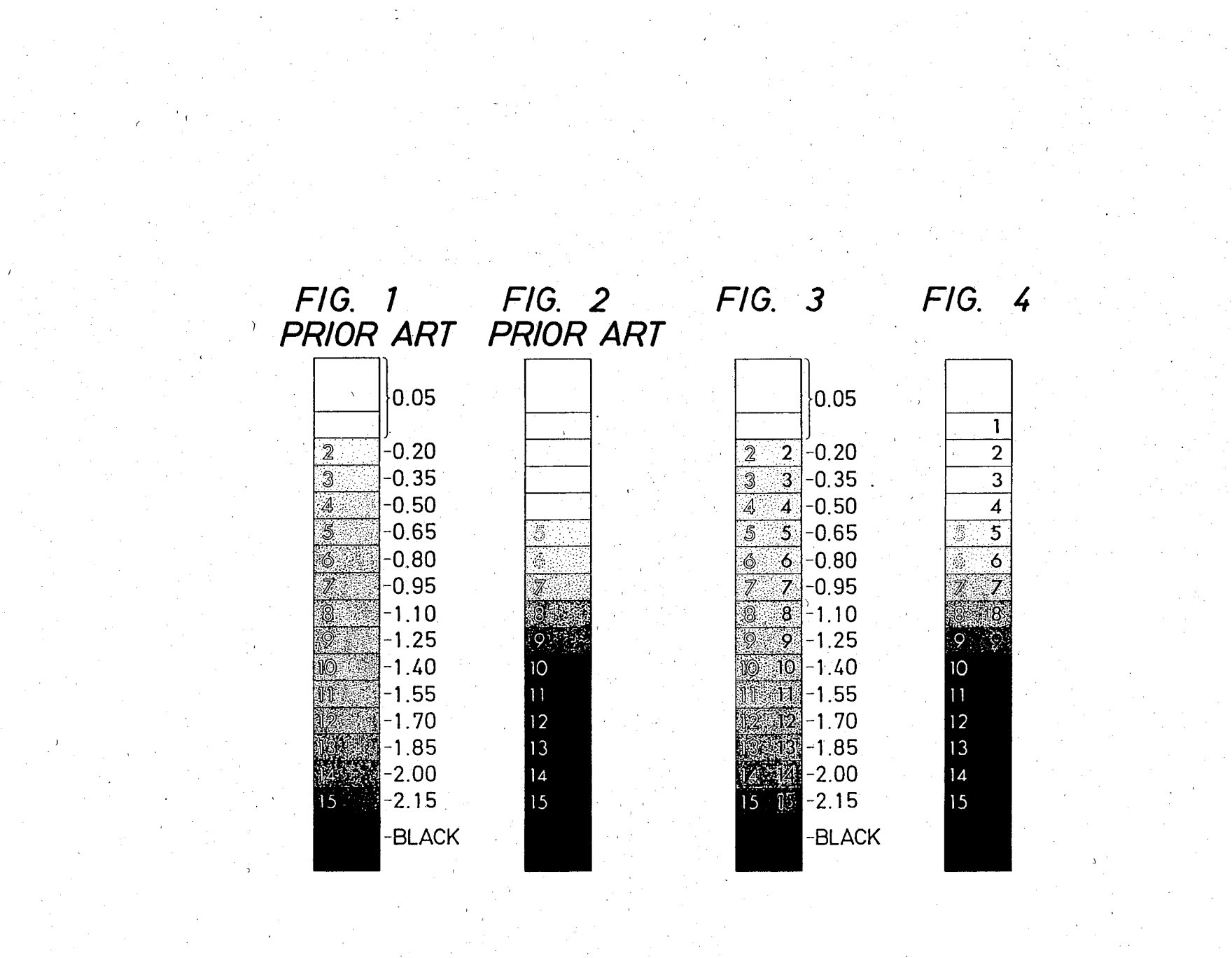

Referring now to FIG. 3, a step tablet constructed in accordance with the teachings of the present invention is shown schematically. The step tablet of this preferred embodiment is composed of 15 steps having respective optical densities, ranging from a minimum of 0.05 to a maximum of 2.15. Further, an area having a density of 3.0 or greaer (black) is provided at the bottom of the tablet. The steps have a like size and are rectangular in shape, although other geometric configurations can be employed if desired.

The 15 steps are marked each with two Arabic numerals "1", "2", . . . , "15", with "1" being assigned to the step of minimum optical density and "15" to the step of maximum density. In this example, the two Arabic numerals for each step are the same, although they can be different, and other characters or symbols can be employed as desired.

According to one important aspect of the present invention, one of the sets of Arabic numerals, for instance, those on the left, have a density equal to the minimum optical density (0.05), while the other has an optical density equal to or higher than the density of the last step (2.15). One set, for example, the set on the left, corresponds to transparency to actinic radiation, preferably corresponding to the minimum optical density, while the other corresponds to opacity to actinic radiation, preferably having an optical density equal to or higher than the maximum optical density.

As shown in FIG. 4 which illustrates a portion of a positive PS plate exposed through the step tablet of the invention, the numerals of the set on the left are most clearly visible in steps of higher density, while the set on the right will be more easily visible in steps of lower optical density. Hence, with the two sets of numerals, it is relatively easy to identify the step which correctly indicates the amount of exposure or degree of exhaustion of the developing solution. That is, it is easy to identify a step for which the numerals of both higher and lower density become discernible.

The number of solid steps can be determined simply by determining the number of the first step having an indicia corresponding to opacity for actinic radiation which is not discernible. Hence, the present invention ensures proper control over the amount of exposure and the degree of exhaustion of the developing solution in terms of the number of solid steps, which is entirely impossible with a conventional step tablet.

I claim:

1. A step tablet comprising: a plurality of step areas, each of said step areas having a different optical density, and said step areas being arranged in an order of optical density; and first and second sets of marking indicia, one indicium from said first set of marking indicia and one indicium from said second set of marking indicia located within each of said step areas, said first and second sets of marking indicia having different optical densities wherein indicia of said first set of marking indicia have an optical density at the maximum corresponding to a step area of said step tablet of minimum optical density, and indicia of said second set of marking indicia have an optical density at the minimum corresponding to a step area of said step tablet having a maximum optical density, each of said first and second sets of marking indicia comprising indicia of the same type within each set.

2. The step tablet of claim 1, wherein said step areas are arranged in an order of optical density.

3. The step tablet of claim 2, wherein said step areas are rectangular in configuration.

4. The step tablet of claim 3, wherein said indicia of said first and second sets of marking indicia comprise Arabic numerals.

5. The step table of claim 4, wherein each step area is marked with identical indicia of Arabic numerals.

* * * * *